United States Patent [19]

Peters et al.

[11] 4,127,958

[45] Dec. 5, 1978

[54] MOUSE TRAP

[76] Inventors: John Peters, P. O. Box 548; Edward E. Thompson, P. O. Box 134, both of Norwood, Colo. 81423

[21] Appl. No.: 813,804

[22] Filed: Jul. 8, 1977

[51] Int. Cl.² ........................................... A01M 23/20
[52] U.S. Cl. ............................................................ 43/81
[58] Field of Search .................. 43/61, 81, 81.5, 82, 43/83, 83.5

[56] References Cited

U.S. PATENT DOCUMENTS

| | | | |
|---|---|---|---|
| 139,182 | 5/1873 | Norman | 43/82 |
| 1,587,536 | 6/1926 | Lobit | 43/61 |
| 1,799,149 | 4/1931 | Burnley | 43/81 |
| 2,478,286 | 8/1949 | Lanza | 43/81 X |
| 2,684,553 | 7/1954 | Schroeder | 43/81 |
| 2,748,526 | 6/1956 | Roman | 43/81 X |
| 3,762,093 | 10/1973 | Rohde | 43/61 |

Primary Examiner—Harold D. Whitehead
Attorney, Agent, or Firm—Gary M. Polumbus

[57] ABSTRACT

A mouse trap includes first and second telescopically related housing members which are movable between extended and retracted positions. A door opening is provided in one of the housing members which provides access to the interior of the housing when the housing is in its extended position but which is blocked by the other housing member when the housing is in its retracted position. A spring biased striker arm is mounted within the housing members and is adapted to be held in a cocked position by a trigger arm when the housing members are extended. Actuation of the trigger arm causes the striker arm to deliver a lethal blow to a mouse who has released the trigger arm and also causes the housing members to be simultaneously moved to their retracted position.

10 Claims, 6 Drawing Figures

U.S. Patent
Dec. 5, 1978
4,127,958
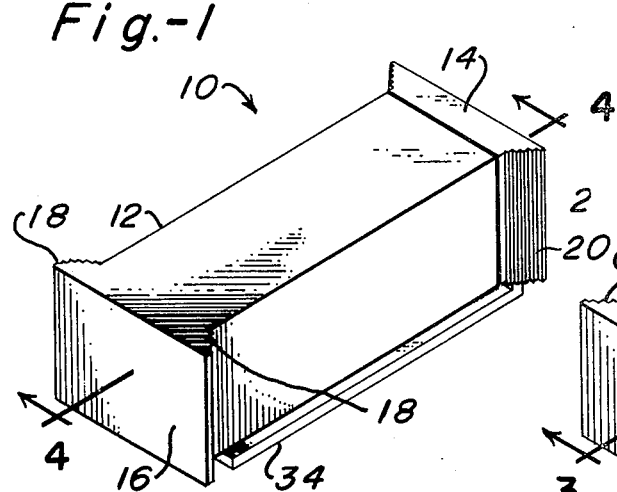
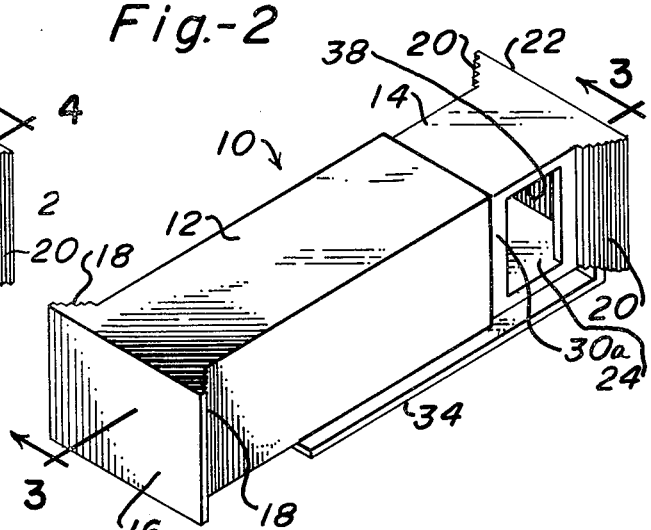
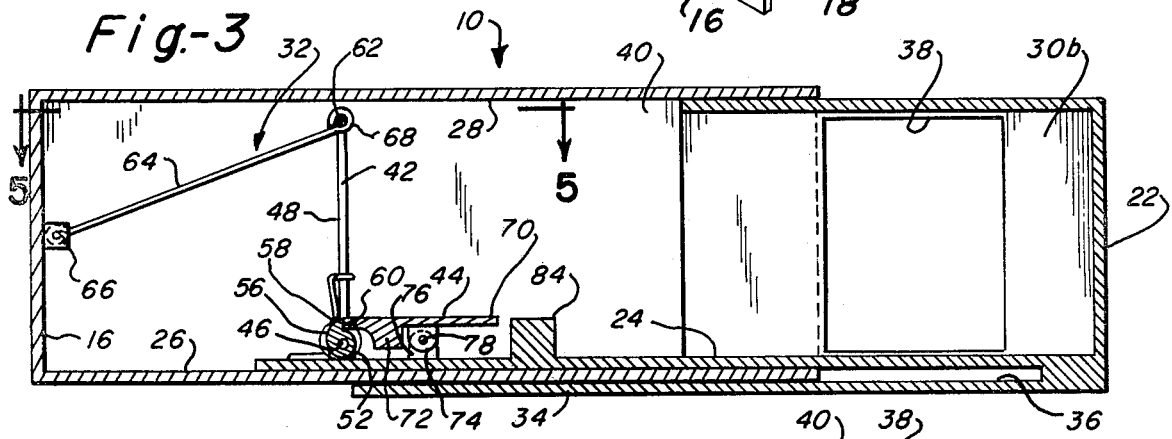
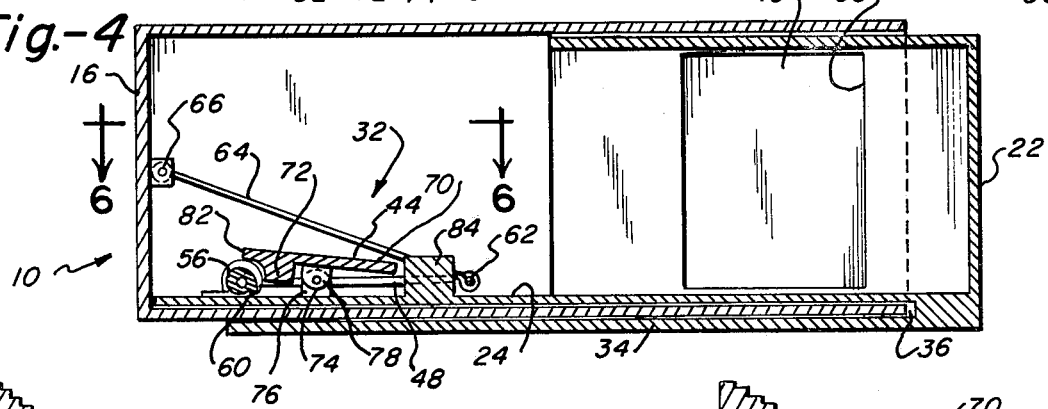
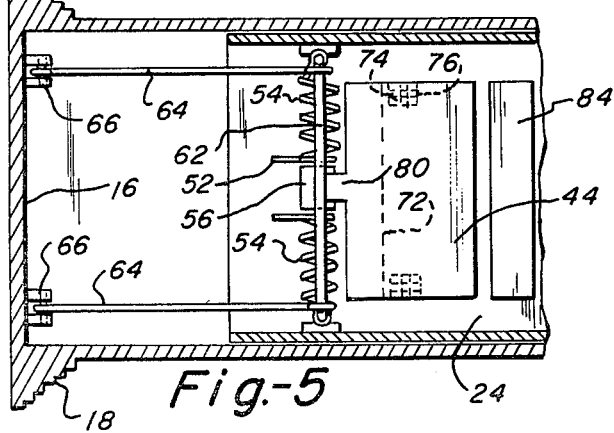

MOUSE TRAP

BACKGROUND OF THE INVENTION

Mouse traps have been designed in numerous ways throughout the years but by far the most popular mouse trap, at least from a commercial standpoint, is the mouse trap which has a base plate upon which is mounted a spring biased striker arm which can be moved from a released position to a cocked position and releasably held in the cocked position by a wire bale and a baited trigger arm which cooperate in releasing the striker arm to deliver a lethal blow to a mouse or the like when the mouse touches the trigger arm. This type of mouse trap has proved to be adequately reliable but very crude and distasteful to housewives who have the chore of removing the mouse trap or in disposing of the trap and the mouse as a whole.

Other mouse traps such as of the type described in U.S. Pat. No. 3,762,093 owned by William E. Rhode have made attempts to conceal the mouse within a housing when it is killed or otherwise trapped so that a housewife or the like can dispose of the mouse and/or the trap without seeing the dead mouse, but to applicant's knowledge, such mouse traps have not met with commercial success possibly due to the complexity of the devices which have a direct effect on the expense of manufacturing the mouse trap.

Another drawback of prior art mouse traps, whether they be of the exposed or enclosed type, is that they are an attractive nuisance insofar as small children are concerned since children are intrigued with the mouse traps and can easily get their finger or other body member caught in the trap possibly causing bodily harm to the child. It does not appear that developers of prior art mouse traps have given any meaningful thought to child proofing mouse traps so that they do not pose a potential hazard for small inquisitive children.

SUMMARY OF THE INVENTION

It is a primary object of the present invention to provide a new and improved mouse trap which not only encloses the mouse after killing it but also is child proof so that small children cannot be hurt by the mouse trap.

It is another object of the present invention to provide an inexpensive mouse trap which is designed to completely enclose and conceal a mouse upon delivering a lethal blow thereto.

The mouse trap of the present invention includes a pair of slidably related housing members which automatically cock a striker arm disposed internally of the housing upon movement of the housing members from a retracted to an extended position. When disposed in the extended position, an opening into the interior of the housing is provided so that a mouse can enter the housing and upon releasing a baited trigger arm cause the striker arm to be released delivering a lethal blow to the mouse while simultaneously moving the housing members to a retracted position wherein the door opening is closed and the dead mouse is concealed in the housing.

The door opening is positioned in the housing so that a finger of either a child or an adult cannot normally reach the trigger mechanism thereby preventing accidental bodily harm to a child or an adult.

The advantages of a mouse trap of the type to be described in more detail hereinafter will be readily appreciated in that the device is inexpensive to manufacture, simple to operate, operates in a reliable manner, is child proof and completely encloses and kills a mouse so that a housewife or other individual utilizing the mouse trap is protected from the unsightly appearance of a dead mouse.

Other objects, advantages and capabilities of the present invention will become more apparent as the description proceeds taken in conjunction with the accompanying drawings.

BRIEF DESCRIPTION OF THE DRAWINGS

FIG. 1 is a perspective view of the mouse trap of the present invention with the housing members in a retracted position.

FIG. 2 is a perspective view similar to FIG. 1 with the housing member in an extended position.

FIG. 3 is an enlarged vertical section taken along line 3—3 of FIG. 2.

FIG. 4 is an enlarged section taken along line 4—4 of FIG. 1.

FIG. 5 is a further enlarged fragmentary horizontal section taken along line 5—5 of FIG. 3.

FIG. 6 is a further enlarged fragmentary horizontal section taken along lines 6—6 of FIG. 4.

DESCRIPTION OF THE PREFERRED EMBODIMENT

The mouse trap device 10 of the present invention includes an outer housing member 12 and an inner housing member 14 which are telescopically related so as to be slidably movable relative to each other between a retracted position as shown in FIG. 1 and an extended position as shown in FIG. 2. Each housing member is of quadrangular transverse cross-section with the inner housing member 14 having a slightly smaller cross-sectional area than the outer housing member. The outer housing member has a closed end wall 16 at what will be referred to as the rear end of the device with the forward end of the outer housing member being open to receive the inner housing member. The rear end 16 of the outer housing member has a pair of flared and roughened sidewalls 18 establishing a gripping surface for a purpose to be described later and due to the flared walls, the rear end wall 16 of the outer housing member is slightly larger in area than the cross-sectional area of the remainder of the outer housing member.

The inner housing member 14 has a pair of flared and roughened sidewalls 20 at its forward end for a purpose to be described later, so that the forward end wall 22 of the inner housing member is slightly larger in area than the cross-sectional area of the remainder of the inner housing member. The bottom wall 24 of the inner housing member is approximately the same length as the bottom wall 26 of the outer housing member 12 so that when the housing members are in the retracted position of FIGS. 1 and 4, the bottom wall of the inner housing member completely overlies the bottom wall of the outer housing member. The top wall 28 of the inner housing member is approximately half the length of the bottom wall 24 and is equal in length to the two sidewalls 30a and 30b of the inner housing member. The extra length on the bottom wall 24 of the inner housing member is utilized to mount a striker mechanism 32 for killing a mouse which will be described later. The inner housing member 14 has a skid or extension plate 34 extending rearwardly from the front of the inner housing member and is spaced a small distance from the bottom wall 24 of the inner housing member. The skid cooperates with the bottom wall of the inner housing member in defining a flat elongated pocket 36 adapted to slidably receive the bottom wall 26 of the outer housing member. With this arrangement it has been found that the housing members will slide easily between their retracted and extended positions to facilitate operation of the device as will become more clear with the description hereinafter.

One sidewall 30a of the inner housing member 14 is provided with a rectangular door opening 38 near the forward end thereof even though such an opening could also be provided at the same location in the opposite sidewall 30b of the inner housing member if desired. The opening 38 is provided to allow access to the interior of the housing by a mouse or other animal to be trapped in the device. As will be appreciated, a mouse can only enter the housing through the opening 38 when the housing members are in the extended position of FIGS. 1 and 3. In the retracted position the opening is blocked by the sidewall 40 of the outer housing member as is best illustrated in FIG. 1.

As mentioned previously, the striker mechanism 32 for delivering a lethal blow to a mouse or the like is mounted on the bottom wall of the inner housing member 14 near the rearward end thereof. The striker mechanism includes a spring biased striker arm 42 adapted to deliver a lethal blow to a mouse or the like and a trigger arm 44 adapted to hold the striker arm in a cocked position until a mouse moves the trigger arm thereby releasing the striker arm so that it is rapidly driven to its released position.

The Striker arm 42 is generally U-shaped in configuration having the terminal ends 46 of its side legs 48 integrally connected to opposite ends of a pivot rod which is rotatably mounted on a block 52 secured to the bottom wall 24 of the inner housing member in a manner such that the pivot rod 50 extends transversely of the housing. The striker arm and pivot rod are connected so that they move in union with each other, i.e., as the striker arm is moved from its released position of FIG. 4 to the cocked position of FIG. 3, the pivot bar is caused to rotate in a counter-clockwise direction as viewed in FIGS. 3 and 4 about its longitudinal axis. The pivot rod has a pair of coil springs 54 mounted concentrically thereon, each of which has one end of the spring anchored against the mounting block 52 and the opposite end connected to one side leg 48 of the striker arm so as to bias the striker arm into its released position. Movement of the striker arm to its cocked position of course coils the springs 54 so that upon release of the striker arm, the springs drive the striker arm quickly and abruptly to its released position. The coiled springs are separated by a collar 56 which is mounted on the pivot bar 50 for unitary movement therewith with the collar having an ecentric portion 58 defining a detent 60 into which the trigger arm 44 is adapted to be seated when the striker arm 42 is in its cocked position. The collar is fixed in position on the pivot rod by a set screw, adhesive or the like (not shown) so that it will remain in position and will move in unison with the pivot rod.

The transversely extending leg 62 of the striker arm is pivotally connected to the rear wall 16 of the outer housing member 12 by a pair of connecting arms 64 each of which is pivotally joined to the rear wall of the outer housing member by a bracket 66 and have their forward ends pivotally connected to the striker arm as by a loop 68 provided thereon. It will thus be appreciated that since the striker arm has its side legs 48 connected to the pivot rod so as to be anchored to the inner housing member and its transverse leg 62 anchored to the outer housing member by the connecting arms 14, movement of the housing members from their retracted position of FIG. 4 to their extended position of FIG. 3 will cause the striker arm to be moved counterclockwise from a generally horizontal position to its raised cocked position as shown in FIG. 3.

The trigger arm 44 is adapted to hold the striker arm 42 in the cocked position of FIG. 3 until the trigger arm is jostled or moved as by a mouse in which instance, the trigger arm releases the striker arm so that it can move abruptly in a clockwise direction, as viewed in FIGS. 3 and 4, to the released position of FIG. 4 wherein it delivers a lethal blow to the mouse. The trigger arm consists of a generally platelike member 70 extending transversely across the width of the inner housing member with the plate 70 having a thickened portion 72 at its rearward end and a pair of depending ears 74 at opposite sides which are positioned at a location which is approximately intermediate the front and rear edges of the trigger arm. The ears 74 are positioned immediately adjacent to a pair of upstanding brackets 76 which are anchored to the bottom wall 24 of the inner housing member with both the brackets 76 and ears 74 having laterally extending passages therethrough which are adapted to be aligned and receive a pivot pin 78 so that the trigger arm is mounted for pivotal movement about the pivot pins 78. The thickened portion 72 of the trigger arm tends to gravitationally bias or urge the trigger arm in a counterclockwise direction about the pivot pins so that the rearward edge of the trigger arm is urged downwardly.

The trigger arm has a rearward extension 80 from its rear edge which is centered transversely of the trigger arm in alignment with the collar 56 on the pivot rod 50. The extension 80 on the trigger arm is adapted to drop into the detent 60 on the collar when the striker arm is placed in its cocked position of FIG. 3. As will be appreciated, the detent in the collar has an abutment surface 82 against which the extension 80 on the trigger arm abuts when the striker arm is cocked thus preventing the striker arm from moving to its released position. However, when the trigger arm is moved in a manner such that the rearward extension 80 is elevated out of the detent 60 in the collar, the striker arm is immediately released and allowed to move in a clockwise direction in a rapid and an abrupt manner due to the spring bias placed thereon by the coil springs 54. A block member 84 is mounted on the bottom wall 24 of the inner housing member 14 immediately in front of the trigger arm 44 so as to extend transversely of the device and at a location such that the transverse leg 62 of the striker arm is disposed forwardly of the block 84 when in its released position. The block 84 has been found to assist in killing a mouse when the striker arm is released and helps to assure that the mouse is killed upon release of the striker arm and is not merely pinched against the bottom wall of the inner housing member.

The trigger arm 44 is preferably scented with a substance which is attractive to mice and could be any number of well known substances known to attract mice so that cheese or another like substance does not have to be placed in the device when in use.

In operation of the device, the flared sides 18 and 20 of each of the housing members are gripped with fingers of an individual's hands and the housing members 12 and 14 are pulled from their retracted position of FIGS. 1 and 4 to the extended position shown in FIGS. 2 and 3. When the housing members attain this position, the trigger arm 44 seats in the detent 60 on the collar 56 so that the striker arm 42 is retained in its raised cocked position by the collar. In this position, the door opening 38 into the interior of the device is exposed so that a mouse, upon smelling the scent on the trigger arm, will enter the housing member 14, pass toward the striker mechanism 42 and attempt to satisfy his longing for the scent which he smells by touching the forward plate 70 of the trigger arm which in turn moves the extension 80 out of the detent 60 and releases the striker arm so that it is immediately and abruptly moved in a counterclockwise direction delivering a lethal blow across the neck of the mouse. Of course, such movement of the striker arm causes the housing members to be quickly moved to their retracted position thereby closing the door opening and concealing the dead mouse within the housing. The entire device can then be disposed of or the device can be opened releasing the mouse from the striker arm so that it can be dropped from the housing through the door opening.

Although the present invention has been disclosed with a certain amount of particularity, it is understood that changes in details of structure may be made without departing from the spirit thereof.

It is claimed that:

1. A mouse trap device comprising in combination: first housing means having an open end therein, second housing means slidably connected to said first housing means and movable between open and closed positions, passage means providing access to the interior of at least one of said first and second housing means when said second housing means is in its open position, said first and second housing means cooperating to block said passage when said second housing means is in its closed position, and releasable spring biased means in one of said housing means operable upon release to deliver a striking blow to a mouse, said spring biased means being operably connected to at least one of said housing means to move said second housing means to its closed position when said spring biased means is released.

2. The mouse trap of claim 1 wherein said first and second housing means are telescopically related and wherein each of said housing means has a closed end wall and an open end with the closed end walls being disposed at opposite ends of the device such that the first and second housing means cooperate, when the second housing means is in its closed position, to provide a totally enclosed chamber.

3. The mouse trap of claim 2 wherein said first and second housing means have side walls extending between the open and closed ends thereof and wherein said passage comprises an opening in a side wall of one of said first and second housing means.

4. The mouse trap of claim 1 wherein said spring biased means includes a striker arm operably connected to both of said first and second housing means, spring means for biasing the striker arm into a released position, and releasable retention means for holding the striker arm in a cocked position, said first and second housing means being operable on movement of the second housing means into its open position to cause the striker arm to be positioned in its cocked position.

5. The mouse trap of claim 3 wherein said spring biased means includes a striker arm operably connected to both of said first and second housing means, spring means for biasing the striker arm into a released position, and releasable latch means for holding the striker arm in a cocked position, said first and second housing means being operable on movement of the second housing means into its open position to cause the striker arm to be positioned in its cocked position.

6. The mouse trap of claim 4 wherein said second housing means is movable from its open position to its closed position as said striker arm is moved into its released position.

7. The mouse trap of claim 2 wherein said second housing means is telescopically received within said first housing means and said second housing means has a skid member extending along the outside of said first housing means so that the second housing means is easily movable into its closed position when said spring biased means is released.

8. The mouse trap of claim 3 wherein said passage is in the side wall of said second housing means near one end thereof and said spring biased means is mounted in said second housing means near the opposite end thereof.

9. The mouse trap of claim 5 wherein said passage is in the side wall of said second housing means near one end thereof, the spring biased means is mounted in and connected to the second housing means near the opposite end thereof, and the striker arm is operably connected to the end wall of the first housing means.

10. The mouse trap of claim 4 wherein said spring biased means includes a transversely extending rod pivotally supported thereon, said striker rod is generally U-shaped in configuration with the terminal ends of the striker arm being connected to the rod for movement therewith, said biasing means is in the form of a coil spring mounted concentrically on said rod and connected to the striker arm to be tensioned upon movement of the striker arm from its released position, and a pivotal trigger arm adapted to cooperate with said retention means to releasably hold the striker arm in its cocked position until the trigger arm is released from the retention means.

* * * * *